Nov. 8, 1938.　　　　E. C. HEAD　　　　2,135,893
GEAR CUTTER
Filed March 6, 1936　　　5 Sheets-Sheet 1
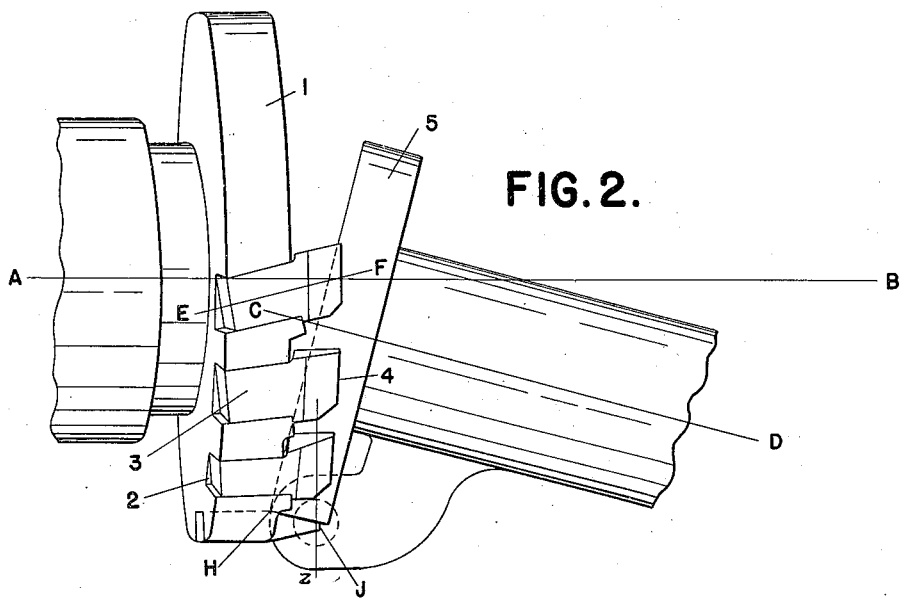
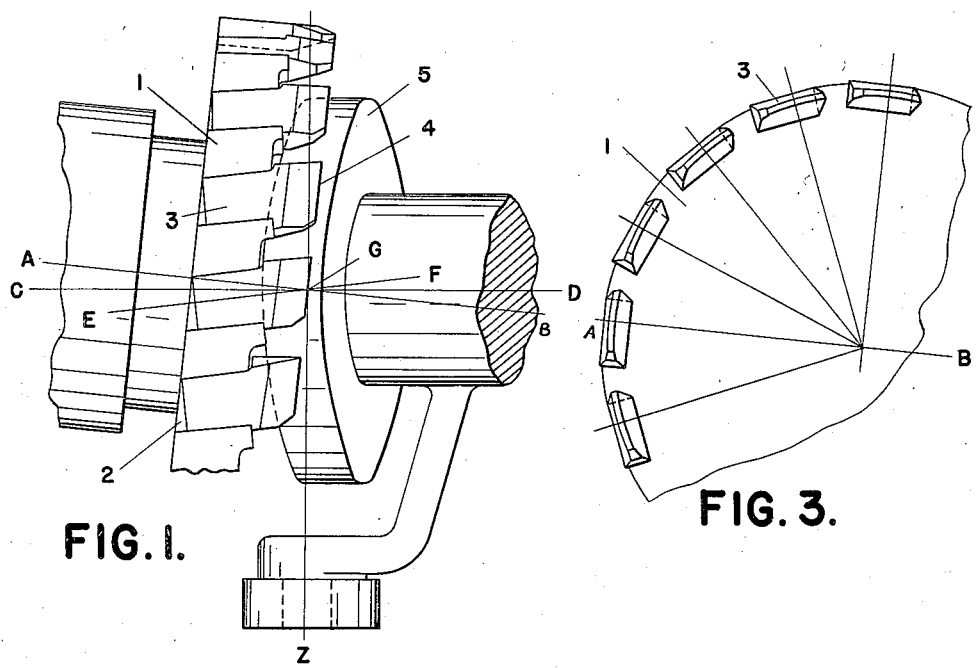
INVENTOR
ERNEST C. HEAD
BY *Whittemore Hulbert*
*Whittemore & Belknap*
ATTORNEYS Nov. 8, 1938.     E. C. HEAD     2,135,893
GEAR CUTTER
Filed March 6, 1936     5 Sheets-Sheet 2

INVENTOR
ERNEST C. HEAD
BY Whittemore Hulbert
Whittemore & Belknap
ATTORNEYS

Nov. 8, 1938.     E. C. HEAD     2,135,893
GEAR CUTTER
Filed March 6, 1936     5 Sheets-Sheet 3
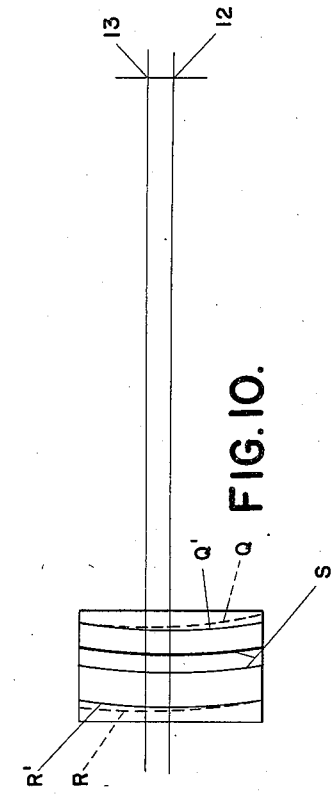
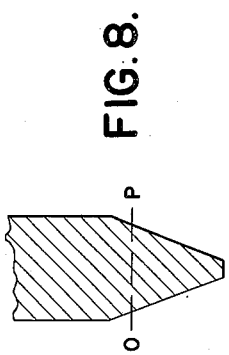
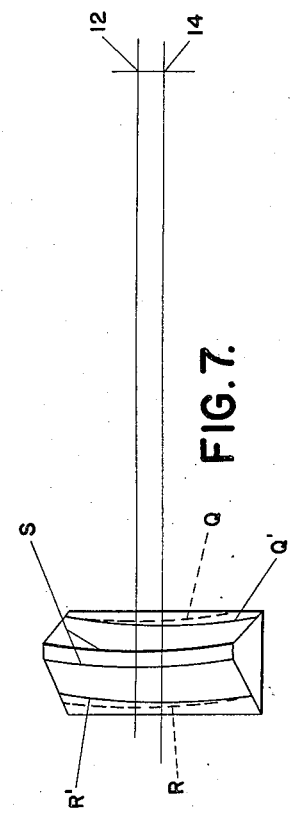
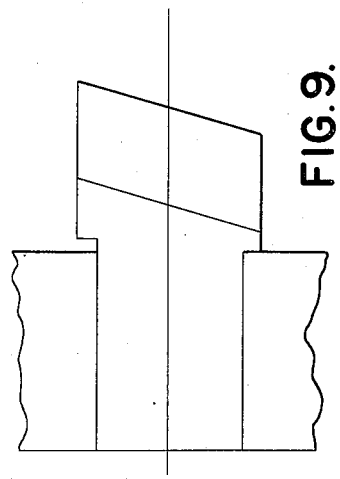
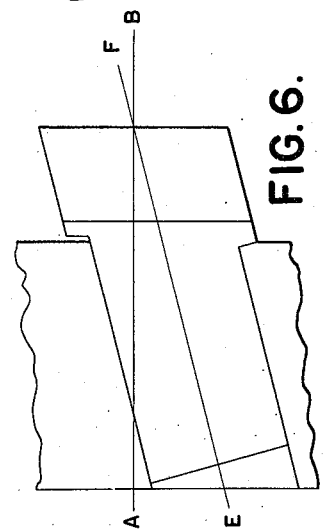
INVENTOR
ERNEST C. HEAD
BY Whittemore Hulbert
Whittemore & Belknap
ATTORNEYS Nov. 8, 1938.  E. C. HEAD  2,135,893
GEAR CUTTER
Filed March 6, 1936  5 Sheets-Sheet 4
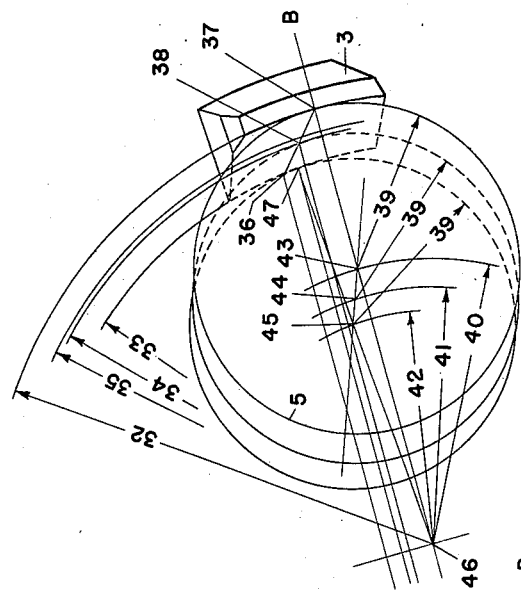
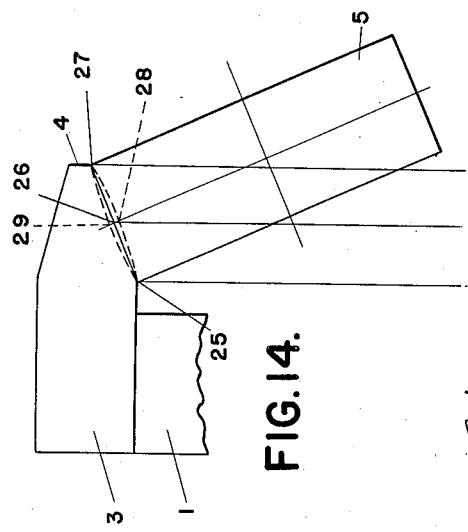
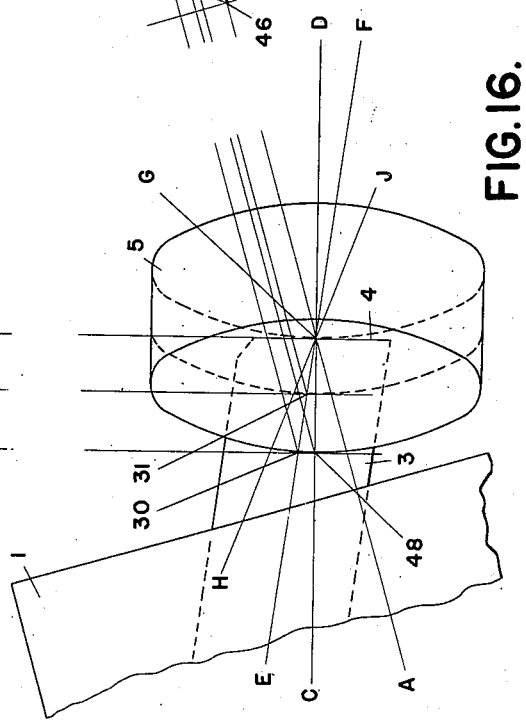
*INVENTOR*
ERNEST C. HEAD
BY
*ATTORNEYS*

Nov. 8, 1938.  E. C. HEAD  2,135,893
GEAR CUTTER
Filed March 6, 1936  5 Sheets-Sheet 5

INVENTOR
ERNEST C. HEAD
BY Whittemore Hulbert
Whittemore Belknap
ATTORNEYS

Patented Nov. 8, 1938

2,135,893

UNITED STATES PATENT OFFICE 2,135,893

GEAR CUTTER

Ernest C. Head, Detroit, Mich., assignor of one-half to Goddard & Goddard Company, Inc., Detroit, Mich., a corporation of Michigan Application March 6, 1936, Serial No. 67,541

14 Claims. (Cl. 29—105)

This invention relates generally to face mill gear cutters and to an improved method of forming the blades of such cutters. The invention has particular reference to cutters for producing gears of the spiraled or curved tooth type, characterized by a continuous curvature of each tooth from end to end.

One of the objects of this invention is to produce a cutter having greater accuracy than the cutters made by the present known methods. A further object is to produce a cutter that is cheaper to manufacture due, first, to the simplified equipment, and second, to the fact that the cutter can be completed in one operation without changing the blades from one work head to another.

Another object of this invention is to provide a cutter blade having the side surface, within which the cutting edge is located, straight from top to bottom and having a constant pressure angle from front to back.

Before describing this invention, it seems advisable to point out the inaccuracies that are found in cutters made by the present known methods in order that I may more readily describe the advantages of the present invention. To those versed in the art it is known that even infinitesimal inaccuracies in spiral bevel gear cutters play an important part in the gears that are produced. A cutter when in operation represents a tooth of a crown gear which is rolled in a fixed relation with the gear being cut, and therefore the tooth of this crown gear should have straight sides inclined to the pressure angle of the gear being cut, which pressure angle is a fixed predetermined angle and should not vary.

In one method for making spiral bevel gear cutters, known as the "relieved" or "backing-off" method, the blades are placed in a cutter head similar to that in which the blades are used. As the cutter is revolved on its axis a relative motion, axially with the cutter, is applied either to the cutter or to the grinding wheel to form a relieved surface back of the cutting edge which takes the form of a helical surface. As the top of the blade is on a different diameter than the bottom, it can readily be seen that the helical or spiral angle developed is constantly changing from top to bottom of the blade. Consequently in grinding the blade, a grinding wheel must contact this hedical surface along the elements of constantly changing helical angles with the result that the cutting edge produced is not a true straight line but is slightly curved.

Another known method for manufacturing these cutters consists of offsetting or positioning the blades at an oblique angle in a rotary head, the amount of this angle depending on the clearance desired. The blades are ground in this position to form the surface of a cone. In use the blades are placed back in their normal radial position which is a different position from that in which they were ground. Thus although the blades are ground as portions of true cones, yet in use the cutting edge lies along a sectional element which is parallel to, but offset from the axis of the cone. The cutting edge therefore takes the shape of a portion of a hyperbolic curve. Furthermore as the blades are resharpened, the offset from the center of the true cone changes and consequently the characteristics of the hyperbolic curve also change with each successive resharpening, with the result that the blades cannot be the same shape from front to back, nor can they have a straight cutting edge from top to bottom.

My invention eliminates the inaccuracies caused by the grinding methods mentioned above, and provides a cutter having blades which are straight from top to bottom along the cutting edge and have a constant pressure angle from front to back, thus insuring uniformity of cutting action no matter how far back the blades are sharpened.

In order to more fully understand the nature of my invention, reference should be made to the accompanying drawings, in which Figure 1 is a side elevation of a cutter head illustrating the manner in which the cutting faces of the inside cutter blades are ground;

Figure 2 is a top projection of Figure 1;

Figure 3 is a fragmentary front view of the cutter head;

Figure 6 is a side elevation of a single cutter blade in position to be ground;

Figure 7 is a projection from the front of the blade;

Figure 8 is a cross section of the blade;

Figure 9 is a side elevation of the blade in the position in which it is used;

Figure 10 is a projection from the front thereof;

Figure 14 is a diagrammatic view of the inside blade showing the same relationships as Figure 11;

Figure 15 is a diagrammatic view of the inside blade similar to Figure 12;

Figure 16 is projected from Figure 14 in the same manner as Figure 13;

Figure 5:
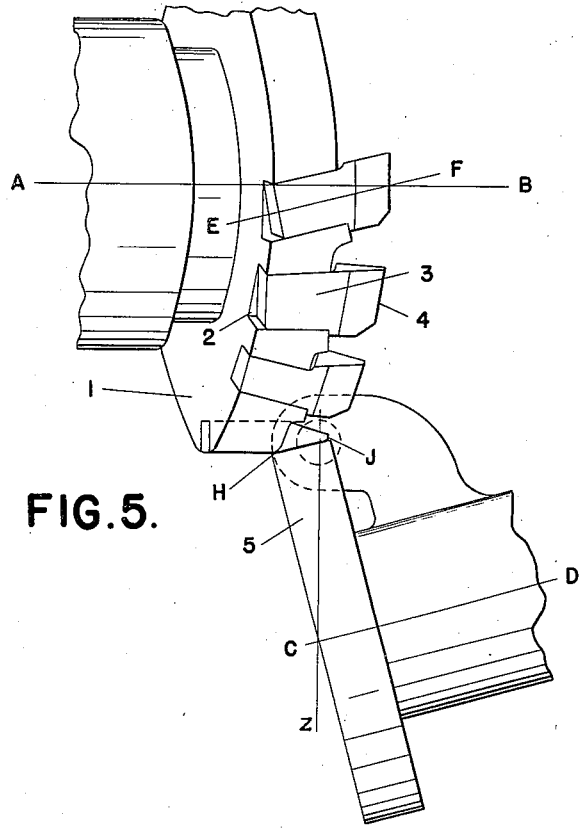
Figure 5 is a top projection of Figure 4.
Figure 21:
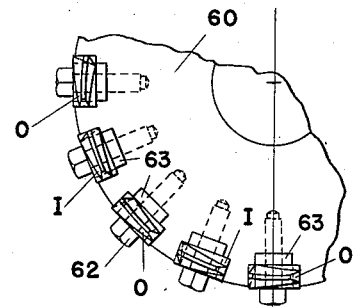
Figure 21 is a fragmentary plan view of a face mill gear cutter made in accordance with the invention.
Figure 22:
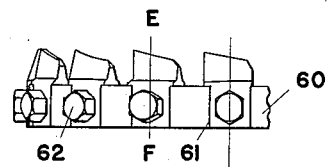
Figure 22 is a fragmentary side elevation of the cutter shown in Figure 21.

Referring now to the drawings, I, Fig. 1, is a dummy head having a series of blade-receiving slots 2 for receiving the blades 3 to be finished. The blade slots 2 are inclined to the axis AB of the head so that the longitudinal axis EF of the blade makes an angle equal to the clearance angle desired back of the top cutting edge of the blade. Thus the top edge 4 of the blades lies in a plane normal to the axis AB of the head and these top surfaces may therefore be finish ground with a grinding wheel having a plane operating surface. A dummy head constructed as thus far described has previously been used for the grinding of the top edges of cutter blades and such a head has also been used for grinding inside and outside surfaces of roughing cutter blades. This forms the side surfaces of the blades as conical surfaces, but when such roughing blades are tipped back so that the axis EF becomes parallel to the axis AB, which is the position in which the blades must be used for gear cutting, the pressure angle is different at the front edge of the blade than it is at the rear edge. Also there is a slight curvature of the cutting edge, whereas a straight edge is desired. While the above method has been used for roughing blades, it obviously could not be used for finishing blades because in a finishing blade it is essential that the pressure angle be a constant predetermined angle and that the cutting edge be a straight line in order to accurately cut a spiral bevel gear.

I have discovered that it is possible to grind the side faces in the blades of the dummy head as described if certain necessary corrections are made so that the blade when in use will have a straight cutting edge and a constant pressure angle.

In order to obtain a straight cutting edge it is necessary to eliminate the slight curvature which is inherent when the method for grinding the roughing cutter blades is used. I have found that this curvature may be eliminated by tilting the axis of the grinder wheel with respect to the axis of the dummy head to a certain predetermined angle. Thus as shown in Figures 1, 2 and 3, the axis CD of the grinder wheel is inclined with the axis AB of the dummy head at an angle such that in the projection of Figure 2 it is parallel to the inside edge HJ of the inside cutter blade and in the projection of Figure 1 the grinder axis CD is also inclined with respect to the axis AB of the dummy head. The inclination of the grinder axis CD if properly computed will grind a curved line from the points HJ when projected into the plane AB, which curved line will become a straight line when projected into the plane of the axis EF.

The angle AGC represents the angle for tilting the axis of the dummy head in relation to the axis of the grinder wheel.

Figure 4:
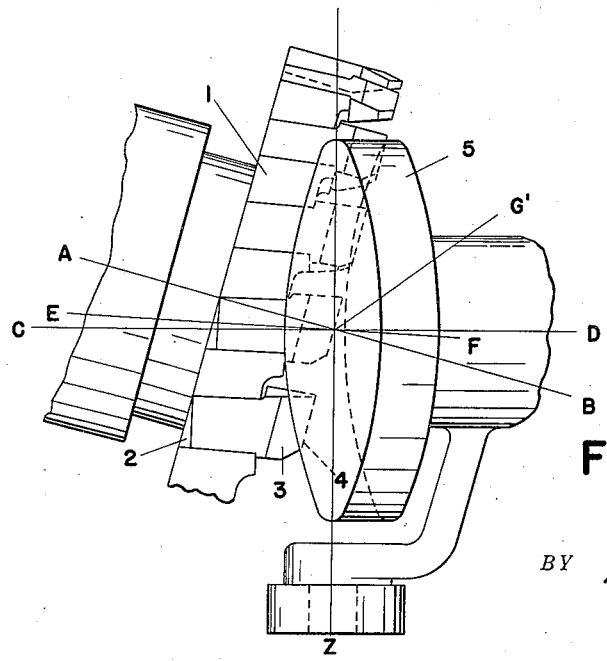
Figure 4 is a side view of a cutter head showing the relation of the grinding wheel for grinding the cutting faces of the outside cutter blades.

Figures 4 and 5 illustrate corresponding positions of the dummy head and the grinder wheel used for grinding the outside surfaces of outside cutter blades. Here again the axis CD of the grinder wheel is in the projection of Figure 5 inclined with respect to the axis AB of the dummy head at an angle corresponding to the pressure angle of the outside cutter blade. In the projection of Figure 4 the axis CD is inclined with respect to the axis AB at such a predetermined angle that the line through the points HJ when projected into the plane AB is a curve but when projected into the plane EF of the cutter blade is a straight line, and is accomplished by the angular position of the grinding wheel in relation to the dummy head.

In accordance with my invention, the axis of the grinding wheel 5 is not made to coincide with the plane through the line AB as in the previously known method for grinding roughing blades, but is tipped to a different angle in order to make the necessary correction to eliminate the errors hereinbefore referred to. The axis of the grinding wheel is along the line CD in Figure 1 and therefore the surface HJ when considered in the plane AB is a curved line which, however, becomes a straight line when measured in the plane EF. The angle AGE is the angle of inclination of the cutter blade in the dummy head and the angle AGC is the angle for tilting the cutter head in relation to the grinding wheel.

A similar method is used for grinding outside cutter blades and this is illustrated in Figures 4 and 5. The same reference characters are used in Figures 4 and 5 and it will therefore be observed that the line AB represents the axis of the cutter head. The line CD represents the axis of the grinder wheel and the line EF is the longitudinal axis of the cutter blade. These axes cross in the side view as illustrated in Figure 4 at the point G' which is a point on the outside edge of the cutter blade at the top surface thereof on the longitudinal axis of the cutter blade. The angle AG'C is the angle for tilting work in relation to the grinding wheel.

Figure 11:
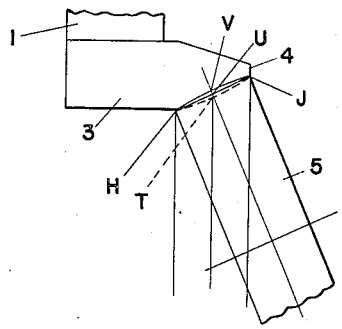
Figure 11 is a diagrammatic view of the outside blade in the plane of the grinding wheel axis with a sectional view of the cutter blade taken along line CD.
Figure 13:
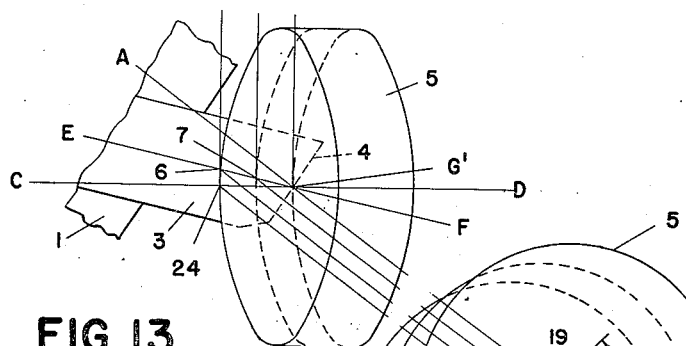
Figure 13 is a view projected from Figure 11 showing the angular relationship between the blade dummy head and grinding wheel axes.
Figure 12:
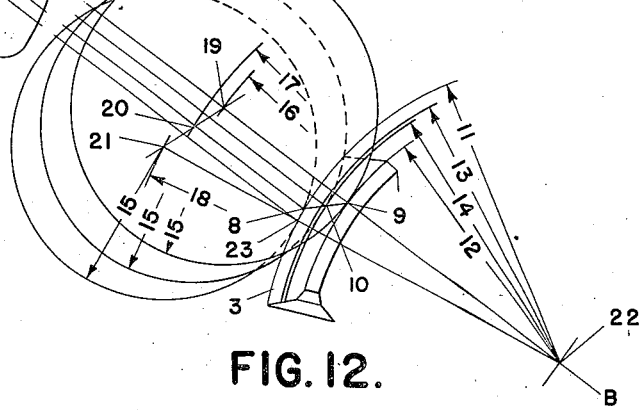
Figure 12 is a diagrammatic view of the outside blade normal to the axis of the cutter dummy head and a projected view of the grinding wheel.

Figures 11, 12 and 13 are diagrammatical views by means of which the relationship of the grinding wheel axis to the dummy head axis may be determined in order that the cutting edge of the outside blade will be substantially a straight line. In these views the grinder wheel 5 is in the shape of a cylindrical disk adapted to grind on its outer periphery which is perfectly straight. If the grinding wheel was set to grind on center so that its axis would be in the same plane with the axis AB of the dummy head, a true conical surface would be ground and the line HJ, Figure 2, would be straight in any radial plane AB. Consequently the line HJ when considered in any other plane, such as the plane EF of the cutter blade, will not be straight but the center portion will be curved outwardly to form a slightly convex surface as shown by line HTJ, Figure 11. It is the object of the present invention to produce a straight line HJ in the plane EF and therefore it is desired to set the axis CD of the grinder wheel with respect to the axis AB of the dummy head such that a curved line HVJ will be formed in any radial plane AB whose height of arc VU is exactly the same as the height of the arc TU in the curve HTJ. The curved surface HVJ is produced by tipping the grinding wheel to a certain predetermined angle AG'C with the axis of the dummy head. This angle can be determined by calculation and a method for determining the same is illustrated in Figures 11, 12 and 13.

Project lines from H, U and J in Figure 11 to points 6, 7 and G' in Figure 13. Next in Figure 12 construct radius 12 equal to the radius from point J (Figure 11) to the center of the cutter. Construct radius 11 equal to the radius from H to the center of the cutter. Project in plane AB the line from point 6 to point 8 on radius 11 and then project line from point G' to point 9 on radius 12. Draw line 8, 9. Assuming that line H, U, J is straight in plane EF, the line 8, 9 is also straight. Next project line from point 7 until it intersects line 8, 9 at 10. Draw radius 14 through point 10. Draw radius 13 equidistant between 11 and 12. The difference then between radii 13 and 14 equals the height of arc V, U. Now to produce a surface that has a straight line H, U, J in plane EF, it is necessary to grind the top J on a radius 12, the center portion U on radius 14 and the bottom portion H on radius 11. The radius of the grinding wheel is 15. Construct radius 16 from center 22 equal to 12, plus 15, also radius 17 equal to 14, plus 15 and also radius 18 equal to 11, plus 15. The point 19 is the intersection of the arc 16 with the axis AB and represents the center of the outer edge of the grinding wheel, which edge contacts the cutter blade at the point G', which is the point where the axis CD of the grinding wheel and the axis AB of the dummy head intersect. With the point 19 determined, it is necessary to compute positions along radii 17 and 18 from point 19 where a straight line will intersect said radii at the points 20 and 21 and where the distance 19, 20 will equal the distance 20, 21. Line 19, 20, 21 then represents the axis of the grinding wheel. Next construct line 21, 22 which intersects radius 11 at 23. Project line from 23 to 24, Figure 13. Draw line CD through points 24 and G'. This line represents the axis of the grinding wheel and angle AG'C is the angle for tilting the grinding wheel in relation to the dummy cutter head to obtain the curve HVJ having the height of arc V, U equal to the height of arc TU.

The same method of determining the angle to tilt the grinding wheel for grinding the inside cutter blades is shown in Figures 14, 15 and 16. In the inside cutter blades it is desired to grind a convex curve 25, 28, 27 in the blade whose height of arc 28, 26 is the same as the height of arc 29, 26 in the curve 25, 29, 27. The projections in Figures 14, 15 and 16 are obtained in a manner similar to that previously described, but in order to more clearly explain the invention, they will again be repeated. Project lines from 25, 26 and 27, Figure 14, to points 30, 31 and G, Figure 16. Next construct radius 32, Figure 15, equal to the distance from point 27 to the center of the dummy cutter. Then construct radius 33 equal to the distance from point 25 to the center of the dummy. Then in plane AB project line from point 30 to point 36 on radius 33, Figure 15. Next project line from point G to point 37 on radius 32. Draw line 36, 37. If line 25, 26, 27 is straight in plane EF, the line 36, 37 must be straight as the two lines represent the same surface in different projections. Next project line from point 31 until it intersects line 36, 37 at 38. Draw radius 34 through point 38. Then draw radius 35 equidistant between 32 and 33. The difference between radius 35 and radius 34 equals the height of arc 28, 26. The radius of the grinding wheel is 39. Construct radius 40 from center 46 equal to radius 32 minus radius 39, also radius 41 equal to 34 minus 39 and also radius 42 equal to 33 minus 39. The point 43 is the intersection of the arc 40 with the axis AB and represents the center of the outer edge of the grinding wheel, which edge contacts the cutter blade at the point G which is the point where the axis CD of the grinding wheel and the axis AB of the dummy head intersect. With the point 43 determined, it is necessary to compute positions along radii 41 and 42 from point 43 where a straight line will intersect said radii at the points 44 and 45 and where the distance 43, 44 will equal the distance 44, 45. Line 43, 44, 45 then represents the axis of the grinding wheel. Next construct line 46, 45 and extend until it intersects radius 33 at 47. Project line from 47 to 48, Figure 16. Draw line CD through points 48 and G. This line represents the axis of the grinder wheel and angle AGC is the angle of relative tilt between the grinding wheel and the dummy head to obtain curve 25, 28, 27 having a height of arc 28, 26 equal to the height of arcs 29, 26.

It will be understood that Figures 11 to 16 are merely diagrammatic representations of relationships involved. For clearness, certain dimensions, such as the height of the arc UV and UT, for example, are greatly exaggerated. Many methods of solution, such as graphical, mathematical or trial and error will suggest themselves to those skilled in the art and the foregoing description is merely a simple disclosure of the principles involved.

It is desired to point out that the correction which is obtained by means of the tilting of the grinder wheel as above described is very slight but it is an important feature of this invention. For example, the height of arc TU and V, U in actual practice will amount to from .0002 inch to .0005 inch. However by means of this correction I have obtained cutter blades, the cutting edge of which has been carefully checked and shows no variation from a mathematically true straight line on a machine which will measure an error as small as two one hundred thousandths of an inch. It will thus be apparent that by means of the angular inclination of the axis of the grinder wheel, I am enabled to obtain a cutter blade whose cutting edge has a point substantially midway between the two ends in a mathematically straight line with said ends.

The second correction which my invention is adapted to provide is that which is necessary to obtain a constant pressure angle from front to back. This is obtained by swinging the grinder wheel 5 about an axis GZ perpendicular to the grinder axis CD, Fig. 1. The point G is at the top of the inside surface of the inside blade on the axis EF. Likewise the correction on the outside blades is obtained by swinging the grinding wheel 5 about an axis G'Z perpendicular to the grinding wheel axis CD, Fig. 4. The point G' is at the top of the outside surface of the outside blade on the axis EF. This swinging movement about the axes GZ and G'Z is in timed relation to the rotation of the dummy head so that as the blade passes over the grinder wheel from front to back, the angular amount of swing is continuingly changing at a predetermined amount. Means is also provided for quickly returning the grinder wheel to its original position before contacting with the subsequent blade in the dummy head.

Figure 6 illustrates the cutter blade in the dummy head with its longitudinal axis EF inclined with respect to the axis of the head the amount of the top clearance angle of the blade. The top view of the blade is shown in Figure 7, and the cross section in Figure 8. Figure 9 shows the same blade tilted back to the position in which it is to be used in the cutter so that its longitudinal axis is parallel to the axis of the cutter, and Figure 10 is a top view of the blade in this position. The dotted lines Q and R (Figure 7) represent a section at OP in Figure 8 as it would appear if the grinding took place without angle correction. The lines S represent the top edge of the blade. It will be noted that the lines Q, R and S are all struck from a common center 12 and are elements of conical surfaces. Now if the blade is tipped back to the position shown in Figure 9, the lines S still have the effect of being struck from the center 12, but the lines Q and R have the effect of being struck from a different center 13. In order to have a constant angle from front to back in the position shown in Figure 10, the lines Q and R should be struck from the same center as the lines S and are represented by the full lines Q' and R'. Now if the full lines are transferred back to Figure 7, that is, the position in which the blade has in the dummy head while being ground, they have the effect of being struck from the center 14 and represent the correction in angle that must be made from front to back of the blade. During the course of rotation of the blade in the dummy head as it passes the grinder wheel, the swivel is progressively swung an amount so that in Figure 7 the outer edge of the wheel will follow the full lines Q' and R' instead of the dotted lines Q and R. The lines S will not change as the wheel is being swung about its pivotal center because the top edge is located on this pivotal center or along axes GZ and G'Z. While the wheel may be swung to follow lines Q' and R' which are described as radii struck from center 14, it is understood that the swinging movement may be so predetermined that Q' and R' will take the shape of any curved lines. One such line would be a curve so predetermined that all elements in planes radial of the cutter head, such as the plane through the line EF, Fig. 6, would be elements of one and the same cone. Thus it will be seen that in order to have the correct surfaces ground in the finishing cutter blade so that it will be correct for its use in the cutter head, it is necessary to make the pressure angle correction by means of the swiveling movement hereinbefore described. Means for obtaining this swiveling movement is more fully described in my co-pending application Serial No. 67,542, filed on even date herewith, which discloses a machine for manufacturing the cutter blades.

From the previous description it will be seen that in accordance with my invention I have produced a new finishing cutter blade which has a constant pressure angle from the front to the rear and also has a cutting edge which in a plane through the longitudinal axis of the cutter blade as it is used in the cutter is a straight line, or in other words it has a cutting edge in which the point substantially midway between the two ends is in a mathematically straight line with said ends.

When the inside and outside finishing cutter blades have been ground on their top and side surfaces, they are assembled in the cutter head 60 for use in finishing spiral bevel gears which have been previously rough cut. The slots 61 in the head 60 extend parallel to the axis of the head so that the axis EF of the cutter blades is parallel to the axis of the cutter head. I represents the inside cutter blades, and O the outside cutter blades and they are preferably alternated in an annular series. The blades are secured in the head 60 by bolts 62, while shims 63 may be used to adjust the blades radially in the head.

While the points G and G' are described and shown in Figures 1, 4, 13 and 16, as being placed at the top point of the cutting edge of the blade, I do not confine the scope of this invention to this point alone. Points G and G' may be placed at any position along the cutting edge of the blade or even extended outwardly from the cutting point.

While I have shown this construction for manufacturing a cutter having a straight edge along the line EF, yet I do not confine the invention to this line alone, but to any line or any section through a cone other than through its axis AB. For instance, it might be found desirable to make a cutter having the element along the line HJ (Fig. 16) a straight line. In such a case, the mathematical solution as given above would be followed.

Figure 18:
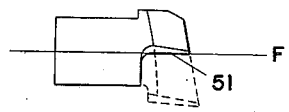
Figure 18 is a side view thereof.
Figure 17:
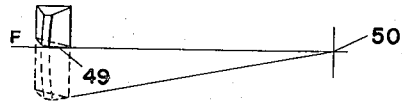
Figure 17 is a plan view of a blade sharpened in the usual manner.
Figure 20:
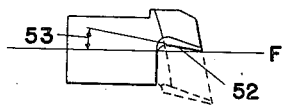
Figure 20 is a side elevation thereof.

In further reference to a cutter made with a straight cutting edge along a line HJ, I wish to point out the value in controlling this straight surface along various elements of a cone. Heretofore these cutter blades have been sharpened so the cutting edge forms a line which is radial with the cutter head in which they are used or along line EF (Fig. 16). If sharpened along any non-radial line such as line HJ the cutting edge does not have the shape of a true cone but is slightly curved as I have brought out in the description of this invention. Hence cutter blades made heretofore have been limited to sharpening so that the cutting edge falls along a line radial with the cutter head, whereas my improved blades can be made so they may be sharpened along any predetermined angle. To illustrate this I have shown Figures 17, 18, 19 and 20. Figure 17 shows a plan view and Figure 18 shows a side view of a blade that is sharpened in the present known manner. That is, the cutting edge 49 forms a line that is radial with the cutter center 50. This cutting edge appears in Figure 18 as shown at 51 and cannot be altered.

Figure 19:
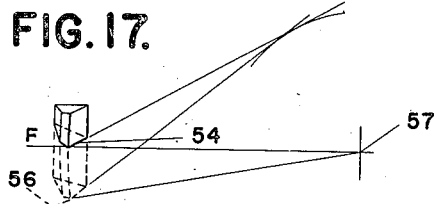
Figure 19 is a plan view of a blade sharpened in accordance with a new method.

It is a well known fact that all cutting tools work best made with the proper rake and shear angles for each individual case. Fig. 19 shows a plan view and Fig. 20 a side elevation of any given blade that is sharpened so that the cutting edge 52 has a shear angle 53 which might correspond to line HJ (Fig. 16). In the plan view Fig. 19, this cutting edge would fall along line 54 which does not extend to the center of the cutter but to a point back of this center. As the cutting edge 54 should be straight from top to bottom of blade and as this cutting edge 54 is not in the normal plane 56—57 of the cone, it is evident that the blade must be ground to some other shape along this normal section.

It will be understood that by shear angle is meant the angle at which the cutting edge is inclined to the direction of motion of the tool through the work, which in the present case results from the rotary motion of the blade about the axis of the cutter head. The rake angle is the complement of the angle at which the front surface of the blade adjacent to the cutting edge is inclined to the direction of the cut. The shear angle refers to the shearing effect, whereas the rake angle refers to the sharpness of the cutting edge. The front surface of the blade might be formed so as to give a zero shear angle and any predetermined rake angle, or vice versa, or it may be formed so as to simultaneously provide a predetermined shear and a predetermined rake angle. In any case, according to the teachings of the present invention, the rake angle and the shear angle may be predetermined as desired, while the cutting edge remains a straight line element with a constant pressure angle.

Therefore using my method for determining this shape, a surface would be ground in plane AB (Fig. 16) which would be a straight line in plane HJ. In this manner accurate cutter blades can be made having any predetermined shear angle 53.

What I claim as my invention is:

1. A gear cutter blade having a top surface axially relieved from front to back, the edge of which forms an arc of a circle, one of the side surfaces of said blade consisting of a modified conical surface, the angularity of said surface with respect to the top surface varying from front to back so as to obtain a constant pressure angle and the elements of said modified conical surface being straight from top to bottom.

2. A gear cutter blade having a top surface axially relieved from front to back, the edge of which forms a curved line, a side cutting edge and a side surface back of said side cutting edge, said side surface consisting of a modified conical surface, the angularity of said side surface with respect to said top surface varying from front to back so as to obtain a side surface whose cutting edge elements from front to back have a constant pressure angle and are mechanically straight from top to bottom.

3. A gear cutter blade having a top surface axially relieved from front to back, the edge of which forms a curved line, a side cutting edge and a side surface back of said side cutting edge, said side surface consisting of a modified conical surface, the angularity of said side surface with respect to said top surface varying from front to back so as to obtain a side surface whose cutting edge elements from front to back have a constant pressure angle and the mid-point of each of said cutting elements lying in a mathematically straight line through the end points thereof.

4. A gear cutter blade having a plane top surface inclined to give top clearance, a side cutting edge and a side surface back of said side cutting edge, the intersection of said top surface and said side surface forming an arc of a circle, all sectional elements of said side surface formed by planes parallel with and below said top surface being spiral curves, each successive sectional element from top to bottom having an increasing rate of spiral to form a side surface whose cutting edge elements from front to back have a constant angle and are mechanically straight from top to bottom.

5. A gear cutter blade for a face mill cutter having a top surface axially relieved from front to back, the edge of which forms a curved line, one of the side surfaces of said blade being ground and consisting of a modified conical surface, the angularity of said surface with respect to the top surface varying from front to back to produce a surface, all elements of which are at the same angle to said top surface in planes radial of the axis of rotation of said cutter and are straight from top to bottom in said planes.

6. A face mill gear cutter comprising a rotary head and a blade which extends in a direction generally parallel to the axis of rotation of said head, said blade having a top edge axially relieved from front to back and forming an arc of a circle, one of the side surfaces of said blade consisting of a modified conical surface, the cone axis of said surface being offset from the axis of said rotary head, said modified conical surface being so warped that the angularity of the side surface changes from front to back so as to obtain a constant pressure angle and the elements of said surface being straight from top to bottom.

7. A gear cutter comprising a rotary head and a blade which extends in a direction generally parallel to the axis of rotation of said head, said blade having a top surface inclined at an angle to give top clearance, the edge of which forms a curved line, one of the side surfaces of said blade consisting of a modified conical surface, the angularity of said side surface with respect to said top surface varying from front to back so as to obtain a side surface, all elements of which in planes radial of the axis of rotation of said cutter have the same angular inclination relative to said axis, and said elements in said planes being straight from top to bottom.

8. A face mill gear cutter comprising a rotary head and a plurality of cutting blades which extend in a direction generally parallel to the axis of rotation of said head, said blades having top edges inclined at an angle to give top clearance and forming curved lines, some of said blades having outside cutting edges, some having inside cutting edges and ground outside and inside surfaces back of said cutting edges, both of said surfaces having modified conical forms so shaped to obtain outside and inside surfaces, all elements of which in planes radial of the axis of rotation of said cutter have the same angular inclination relative to said axis and so shaped that in said planes a straight line will pass through the ends and also a point substantially midway between the ends of said elements.

9. A gear cutter blade having a top surface inclined at an angle to give top clearance, one edge of said top surface forming a curved line, one of the side surfaces of said blade consisting of a modified conical surface, the angularity of said side surface with respect to said top surface varying from front to back so as to obtain side surface elements which, in any plane normal to the curved line of said top edge and making an angle with said top surface substantially equal to the complement of the top clearance angle, are mechanically straight from top to bottom, all of said elements being a constant angle from front to back.

10. A gear cutter blade having a plane top surface relieved at an angle to give top clearance, a side cutting edge and a ground surface back of said side cutting edge, the intersection of said top surface and said side surface forming a circular arc, all sectional elements of said side surface formed by planes parallel with and below said top surface being spiral curves, each successive sectional element from top to bottom having an increasing rate of spiral to form a side surface whose elements, in any plane along the radius of said circular arc and making an angle with said top surface substantially equal to the complement of the top clearance angle, are mechanically straight from top to bottom, all of said elements in said planes being the same angle relative to said top surface.

11. A gear cutter blade having a plane top surface inclined at an angle to give top clearance, one edge of said top surface forming a curved line, one of the side surfaces of said blade consisting of a modified conical surface, the angularity of said side surface with respect to said top surface varying from front to back so as to obtain side surface elements so shaped that a mathematically straight line will pass through the ends and mid-points from top to bottom of said elements, when considered in any plane normal to said curved line and make an angle with said top surface substantially equal to the complement of the top clearance angle, all of said side surface elements being the same angle relative to said top surface.

12. A gear cutter blade having a top surface inclined from front to back to give top clearance, a side cutting edge, a front surface adjacent to and inclined in such a plane as to provide a shear angle to said cutting edge, a side surface back of said cutting edge, the intersection of said top surface and said side surface forming a curved line, said side surface being a modified conical surface, formed by straight line elements inclined to the shear angle of said cutting edge and also inclined at varying angles to said top surface to provide cutting edges which are straight from top to bottom and have a constant pressure angle as the blade is resharpened from front to back.

13. A gear cutter blade having a top surface inclined from front to back to provide top clearance, a side cutting edge, a side surface back of said cutting edge intersecting said top surface in a curved line, said side surface being a modified conical surface formed by straight line elements inclined at different angles to said top surface so as to provide successive straight line cutting edges, which when the tool is sharpened to a given shear and rake angle, will have a constant pressure angle.

14. In a gear cutter comprising a rotary head and a blade which extends in a direction generally parallel to the axis of rotation of said head, a cutter blade having a top surface, a side cutting edge, a side surface, and a curved top edge formed by the intersection of said top surface and said side surface, said side surface being a modified conical surface having an angularity with respect to said top surface which varies from front to back when measured in planes normal to said top edge, said side surface having a constant angle with respect to said top surface when measured in planes radial of said rotary head.

ERNEST C. HEAD.